PRIORITY CONTROL APPARATUS FOR A COMMUNICATION SYSTEM

Filed Aug. 9, 1954

INVENTOR.
Leonard G Walker
BY Mueller & Aichele
Attys.

United States Patent Office 2,731,635

Patented Jan. 17, 1956

2,731,635

PRIORITY CONTROL APPARATUS FOR A COMMUNICATION SYSTEM

Leonard G. Walker, Oak Park, Ill., assignor to Motorola, Inc., Chicago, Ill., a corporation of Illinois Application August 9, 1954, Serial No. 448,641

9 Claims. (Cl. 340—163)

The present invention relates generally to communication systems and more particularly to apparatus for establishing an order of transmission in a system where two or more stations may attempt transmission at the same time or within a given period of time. This invention provides an improvement in the system described and claimed in the copending application of John Doremus et al., Serial No. 328,105, filed December 26, 1952, and assigned to the assignee of the present invention.

There are many instances in the communications field in which it is desirable to have a plurality of transmitters and receivers coupled to a single channel. This is the case for systems used to handle messages as well as those used for control functions. In some of such systems, particularly in the type affording automatic indication and control of remote apparatus, provision must be made for the situation in which two or more remote stations attempt to indicate their respective conditions by transmission at the same time. For example in a system providing indication and control of a power line by a group of stations along the line, it is possible that an occurrence such as a bolt of lightning may cause several changes along the line at once so that several remote stations commence to report the changed condition at the same time. To prevent these signals from interfering with one another on the signal communication channel and any resulting incorrect indication, it is desirable that they be automatically rendered operative singly. Furthermore, it may be advantageous to have a certain order of preference established so that a given station may transmit information into the system before another.

It is an object of the present invention to provide improved priority control apparatus for a communication system which includes a plurality of transmitter-receiver stations, wherein only one station may operate at a time and interference caused by the attempted transmission of two stations at the same time is prevented.

A further object of the invention is to provide improved priority control apparatus for a communication system having a plurality of stations with transmitters and receivers, wherein if more than one station commences transmission within a given interval, the transmissions will be automatically rendered in a selected sequence.

A feature of the invention is the provision of priority control apparatus for a communication system including a plurality of stations on a single channel and wherein a station with intelligence to transmit energizes timing means which operates transmitting apparatus for a selected interval of time to place a preliminary or query signal on the system, with the timing means then automatically de-energizing that apparatus and energizing the receiver for a selected interval which constitutes a listen period, after which the timing means automatically disables the receiver and energizes the transmitting apparatus to transmit the intelligence. Incorporated in each receiver of the system is a signal presence device which temporarily disables the timing means and places the station in a hold condition if a signal from another station is received during the listen period so that with stations simultaneously transmitting query signals, a preference will be given to the station with the shorter listen period since it will commence transmission of its intelligence prior to the time when another station finishes its listen period thereby disabling the other station.

Another feature of the invention is the provision of priority control apparatus with an electronic timer which automatically operates the transmitter device and receiver for query and listen periods in response to a control and including a signal presence device opening a circuit in the presence of a query signal from another station during a listen period and closing this circuit when the query signal ceases to thereby re-commence the listen period so that the listen periods of both stations commence simultaneously and the station having the shorter listening period will commence transmission of its message first.

Further objects, features and the advantages thereof will be apparent upon consideration of the following description when taken in conjunction with the accompanying drawings in which.

In practicing the invention there is provided priority control apparatus for a communication system including a plurality of communication stations coupled to a single channel and wherein each station includes a receiver normally energized and a transmitter device normally de-energized. The term transmitter device is intended to include carrier wave apparatus or equipment designed to emit different audio tones. Each station is further provided with a signal presence device so that when a signal is received thereby transmission from the station is prevented, or if transmission from the station has reached a listen or priority determining period, the station is placed in a temporary hold condition to prevent simultaneous transmissions in the system. When any station starts to transmit intelligence, its transmitter device and an electronic timer are energized. After a first interval, which is the query period, the timer de-energizes the transmitter device and energizes the receiver and provides a second interval, or listen period, which first and second intervals form a priority determining period. At the end of the second interval the receiver is de-energized and the transmitter device is energized to place the signal to be transmitted in the system.

If two stations should start to transmit at the same time, both would transmit the query signal together and they would commence their listening periods together as the query signals of all stations are of the same length. The listening periods of the stations are of different lengths, however, and the station with the shorter listening time will begin transmission of its intelligence first and will thereby actuate the signal presence device in the other station, or stations, thus giving the station with the shorter listening period priority. When a second station attempts to transmit its query signal during the listen period of a first station, the signal presence device at the first station operates to reset the first station to start its listen period anew at the same time that the second station starts its listen period, so that once again the station with the shorter listen period will gain preference to the system even though it may have started its transmission a short interval after that of some other station.

Figure 1:
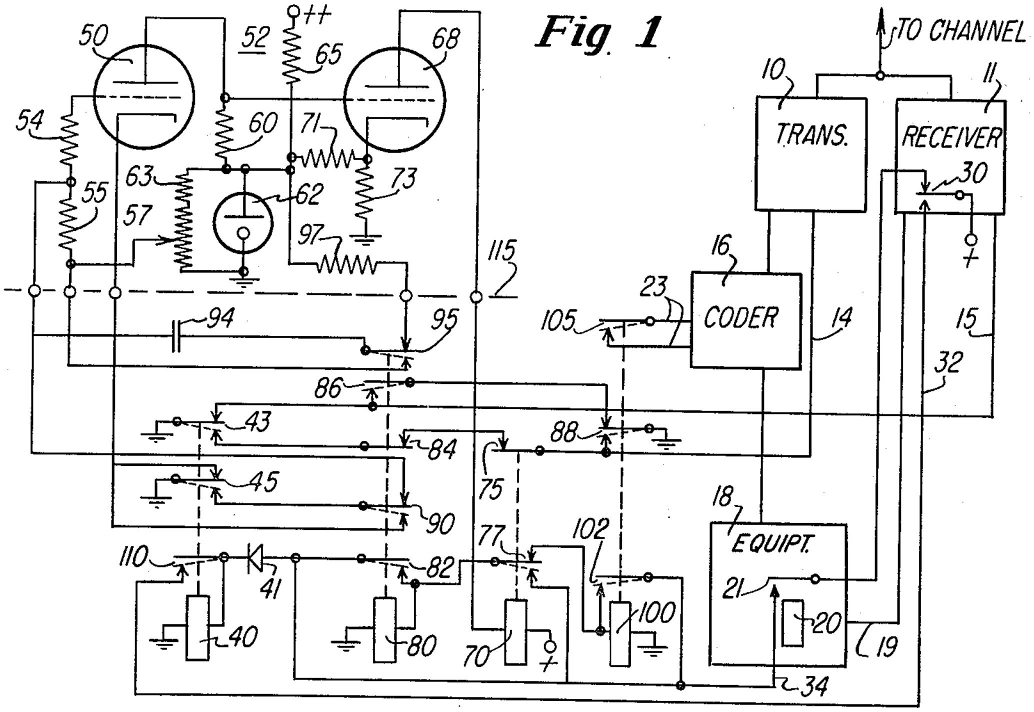
Fig. 1 is a diagram of a remote communication station incorporating the circuit of the present invention.

Referring now to the drawings, there is shown in Fig. 1 a two-way communication system including a transmitter 10 and a receiver 11 coupled to a communication channel which joins with other similar stations. The transmitter is rendered operative by grounding line 14 while the receiver is energized by grounding line 15. Coding unit 16 couples equipment designated generally as 18 to the transmitter 10. This equipment may consist of any remote apparatus and associated switches, the condition of which it is desired to control and indicate remotely via the communication channel. Line 19 is shown coupling equipment 18 to receiver 11 so that received signals may operate the equipment.

Associated with the equipment 18 is a relay device 20 which may be actuated by the equipment when some condition occurs which it is desired to indicate over the system. When contacts 21 of relay 20 are closed and the priority apparatus has functioned as will be presently described, the coder 16 is energized through lines 23 and the transmitter line 14 is grounded so that various conditions of the equipment may operate coder 68 to provide the proper information for transmission via the transmitter 10. The construction of the switches associated with equipment 18 and of the relay device 20 may be such as to remain in a condition of readiness for transmission until the information has been transmitted. This permits a station to be placed in a hold condition during the transmission of another station.

Incorporated in receiver 11 is a signal presence relay or switch 30 which is normally in the solid line position placing a positive potential on line 34 connected to contacts 21, but is moved to the dotted position in the presence of the signal from any other station in the channel to place the positive potential on line 32 and remove it from line 31 during signal reception.

Let us assume now that no signal is being received to actuate the signal presence switch and that a change has occurred in the equipment 18 the indication of which is to be transmitted through the system to a master station, and that relay 20 has been energized due to this change in the equipment 18. In such a case the positive potential is applied through contacts 21 to line 34 and across relay 40 through the diode 41. Therefore relay 40 is energized and ground is removed from lead 15 as contact 43 moves from its solid line position to the dotted line position, thereby placing ground on lead 14 which temporarily disables the receiver and energizes the transmitter.

Relay 40 also includes movable contact 45 which operates at the same time as contact 43 to move from the solid line to the dotted line position so that ground is removed from the cathode of valve 50 in the timer circuit 52. It may be observed that the valve 50 is normally conducting when the cathode is grounded through the solid line position of contact 45, since the grid is at a low positive potential by way of the circuit through resistors 54, 55 and a portion of resistor 57, and anode voltage is supplied thereto through plate load resistor 60. This anode voltage is regulated by a voltage regulator valve 62 operating in conjunction with resistor 57, resistor 63 and resistor 65 which is a network from ground to B++ potential. Since anode load resistor 60 is connected into this network, voltage applied to the anode of valve 50 will be controlled and the timing circuit will be of the required accuracy.

With the cathode circuit of valve 50 open and this valve no longer conducting, the voltage at the anode will rise and cause a rise in the potential on the grid of valve 68 which will now conduct. Anode voltage is supplied for valve 68 through relay 70 and the proper cathode potential is supplied to this valve through the connection thereof to a network of resistor 65, resistor 71 and resistor 73 between ground and B++. When valve 68 conducts and relay 70 is thereby energized, contacts 75 are open to remove the ground from line 14 and de-energize the transmitter. There will be some time required between the energization of relay 40 and the subsequent conduction of valve 68 and energization of relay 70 so that the transmitter will be operative for this period of time. Such an interval is termed a query period or first interval and may be of the order of 50 milliseconds so that it will be of sufficient duration to actuate signal presence means of the other receivers in the system. However, the query period will not be long enough to permit beating of two or more query signals and thereby produce false actuation of any controlled equipment such as equipment 18 at any other station.

When relay 70 is energized, contact 77 will move to its dotted line position thereby connecting relay 80 to line 34, which has a positive potential impressed thereon, so that this relay will be energized. Relay 80 will then close contacts 82 which directly connects the coil thereof to line 34 so that relay 80 will remain energized as long as the positive potential is impressed upon this line. In addition relay 80 opens contacts 84 to provide a second break in line 14, and closes contacts 86 which places ground upon line 15 through the solid line position of contact 88 so that the receiver is rendered operative. Also contact 90 is moved to the dotted position by the energization of relay 80, and this causes the timer to define a second time interval for a listen or reception period.

The cathode of valve 50 will now be grounded through contacts 45 and 90 so that this valve will again become conductive when its grid is at the proper potential for such a condition. It may be noted that prior to energization of relay 80, capacitor 94 was connected through contacts 45 and 90 to ground and through the solid line position of contact 95 and the limiting resistor 97 to the plate of voltage regulator valve 62. Therefore, a certain charge will exist upon capacitor 94. However, when relay 80 is energized, the capacitor is connected to discharge through resistor 55. With the previously grounded side of the capacitor, that is, the negative side thereof, now coupled through resistor 54 to the control grid of valve 50, this valve will remain cut off for a period determined by the constants existing in the resistor-condenser circuit combination and by the tap position on resistor 57 which provides a fine adjustment for the second interval by way of a small voltage opposing the charge on the condenser. When the potential coupled to the grid falls to the proper value, valve 50 will again conduct which will cause the potential at its anode to fall, thereby cutting off valve 68 and de-energizing relay 70. This ends the listen period.

As relay 70 is de-energized, contact 77 will move to the solid line position to apply the same potential which exists across relay 80 to the relay 100. When relay 100 is energized, contacts 102 will close which applies the potential existing in line 34 to this relay to hold it operated as long as the potential exists in line 34. Also at this time contact 88 will move to the dotted line position removing ground from line 15 and de-energizing the receiver and placing ground upon line 14 to energize the transmitter. In addition, contacts 105 will be closed so that the coder 16 may be rendered operative to apply signals from equipment 18 to the transmitter. When this information has all been transmitted, the proper means associated with the equipment 18 may de-energize relay 20 to remove the positive potential from line 34 so that all relays 40, 80 and 100 will be de-energized and the system will be returned to normal with the transmitter off and the receiver operative.

If it should happen that a second station transmits its query signal during the listen period of a first station, the signal presence switch of the first station would move to the dotted position, thereby placing the positive potential on line 32 which would apply the same across relay 40 through its contacts 110 causing this relay to remain energized. Relay 40 may be of the slow acting type so as not to fall out during operation of the signal presence switch 30. However, the positive potential would be removed from line 34 and relay 80 would be de-energized. But valve 68 would remain conducting and relay 70 would remain actuated. During the time that relay 80 is deenergized, the capacitotr 94 will again be connected between ground and the plate of the voltage regulator tube 62 so that it may recharge.

When the query signal of the second station is completed, that station would go into its listen period and at the same time the signal presence relay 30 of the first station would return to its solid line position. Relay 80 will again be energized since the positive potential is impressed thereon through line 34 and the dotted line position of contacts 77. At this re-energization of relay 80, the interval of the listen period will again commence. With both the first and second stations commencing their listen periods at the same time, the one with the shorter listen period will begin transmission of the intelligence to be transmitted first so that the other station will be silenced through operation of its signal presence switch. Therefore, the station with the shorter listen period is preferred.

As previously mentioned the listen periods of the stations are all different but the query periods are of substantially the same length. If two query periods begin simultaneously, both listen periods will also begin together and the station with the shorter listen period will be again preferred.

Figure 2:
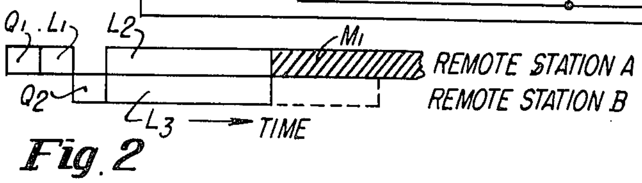
Fig. 2 illustrates the query and listen periods of two stations.

The graph of Fig. 2 illustrates the sequence of transmissions when a remote station B begins transmission a short interval after station A has started transmission. It may be seen that station A first transmits a query signal $Q_1$ and then goes into a listen period $L_1$. However before such period is finished station B has intelligence to transmit and begins by sending a query signal $Q_2$. During signal $Q_2$ station A is placed in hold condition as previously described. When $Q_2$ has ceased, station A recommences its listen period $L_2$ and simultaneously station B goes into its listen period $L_3$. Now if no other station comes on with a signal, the station with the shorter listen period will begin transmission of the intelligence first and will cause the other to be placed in a hold condition. As shown in Fig. 2, station A has the shorter listen period and so it gains priority to the system by beginning transmission of its message $M_1$ which temporarily disables station B until the finish of the signals from A.

Figure 3:
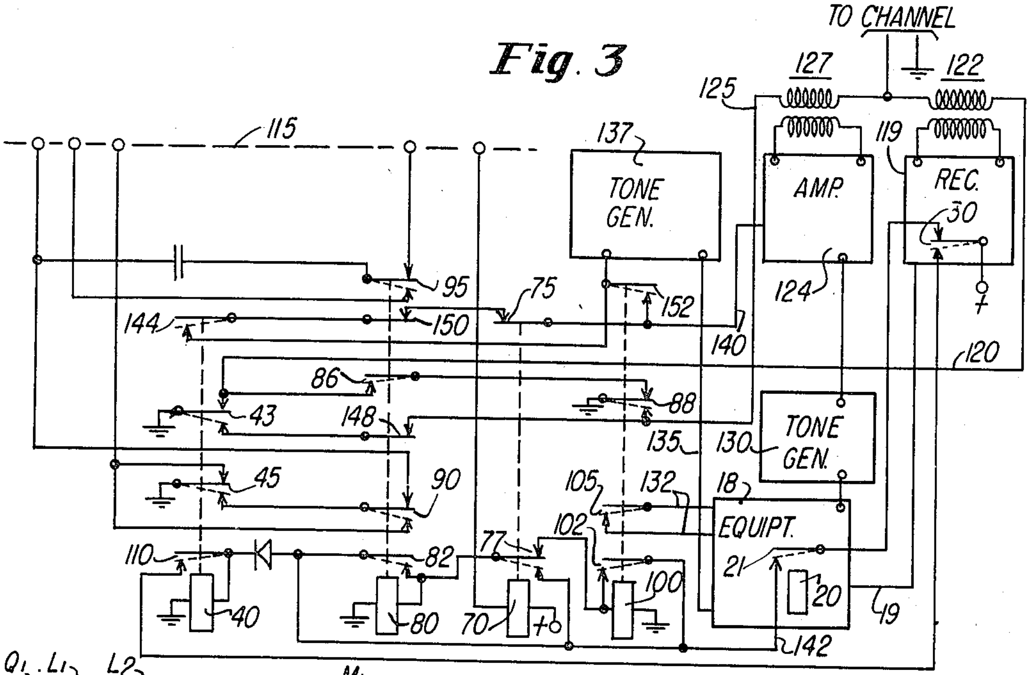
Fig. 3 is a schematic diagram of the circuit when utilized with a different type of transmitter and receiver.

Turning now to Fig. 3 there is shown a second embodiment of the priority control apparatus as used with transmitting and receiving equipment which functions by applying different audio tones to the communication channel rather than a carrier which is modulated to carry the desired intelligence. In this system, the timing portion of which connects to timer circuit 52 at line 115 and is similar to that just described, the receiver 119 is coupled to the channel by grounding lead 120 which is connected to the input transformer 122 and the transmitting tone amplifier 124 is connected to the line by grounding lead 125 which is connected to output transformer 127. The tone generators or oscillators 130 are coupled from the equipment and associated switches to the tone amplifier 124 so that the intelligence is impressed upon the communication channel by rendering operative a tone generator of a certain frequency. Proper equipment may be associated with the tone generator 130 so that connection of leads 132 causes transmission of the intelligence giving remote indication of the condition of the equipment. Lead 135 is connected between equipment 18 and the tone generator 137 and there is apparatus associated with the equipment 18 which energizes this line at the time a transmission is to be made, that is, when there has been a change in the condition of equipment 18, so that the tone generator 137 is rendered operative at that time. The tone generator 137 is designed to transmit the query pulse and to place a signal in the system after the listen period and before the tones which actually convey the intelligence are placed on the line in order to prevent transmission by other stations at that time. The tone generator 137 impresses its signal upon the tone amplifier 124 through line 140 by means of operation to be described presently.

When there is intelligence to transmit, relay 20 is energized closing contacts 21 so that if no signal is being received by receiver 119, the positive potential is placed on line 142 which energizes relay 40. Energization of this relay moves contacts 43 to the dotted line position which places ground on line 125 and couples the output of the tone amplifier to the communication channel and closes contacts 144 which couples the tone oscillator 137 to the tone amplifier 124 so that this signal is applied to the channel. The time during which the tone oscillator is applied to the channel constitutes the query period as previously described and this period is ended when the contacts 75 are opened by energization of relay 70. When relay 80 is energized, contacts 148 are opened which disconnects the output of tone amplifier 124 from the communication channel and switch 150 is also opened so that the output of tone oscillator 137 is no longer applied to the tone amplifier 124. As in the circuit of Fig. 1 receiver 119 is placed on the communication channel by grounding line 120 through switch 86 for the timed listen period after which relay 70 is de-energized and relay 100 is energized. This closes contacts 152 which again couples a signal from tone oscillator 137 to the tone amplifier 124 and couples the output thereof to the communication channel since line 125 is grounded by contacts 88 moving to the dotted position. Therefore a signal from tone oscillator 137 will be placed upon the line to prevent the operation of any other transmitter at this time so that the proper circuitry associated with equipment 18 may operate the proper oscillators 130 to transmit the intelligence.

During the operation of the tone oscillators 130, connection of line 135 may be broken so that at this time the tone oscillator 137 is not operative to cause interference with the signals from any of the oscillators 130. At the completion of the transmission, relay 20 is deenergized which removes the positive potential from line 142, thus opening all the relays and placing the system in its normal condition.

The operation of the tone system of Fig. 3, if a query signal is received during a listen period, is entirely similar to that described for the carrier transmission system of Fig. 1. That is, relays 40 and 70 remain energized with relay 80 de-energized and after the query ends relay 80 again operates to restart the listen period as the other station goes into its listen period.

In summing up the operation of the priority control system it may be noted that if a station begins transmission of its query signal at any time before another station has finished its listen period, the station with the shorter listen period will be operated to transmit its intelligence before the one with the longer listen period. If two stations begins transmission of their query signals at exactly the same instant, the query signals will both be placed upon the system and both listen periods will be started simultaneously but the station with the shorter listen period will begin transmission of its intelligence first, thus disabling the second station and placing it in a hold condition. While a second station may not begin its query signal during a time when a first station is transmitting its query signal, the second station would commence its query signal immediately after the first station began its listen period so that as previously described, the first station would be operated to re-start its listen period at the same time that the second station was beginning its listen period and thus once again the station with the shorter listen time would commence the transmission of its intelligence first, thus gaining priority to the system. If a station begins its query at the same instant another station has finished its listen period and is beginning transmission of intelligence, the second station will be silenced when it goes into its listen period and with a short query (of the order of 50 milliseconds as suggested herein) it will not interfere with the transmission of the intelligence transmitted by the first station.

The priority control system of the present invention provides, therefore, a system to prevent interference of signals placed on a single communication channel within a given time interval which interval corresponds to the time between the start of a query signal and the finish of a listen period. Economy in the communication system is realized since but a single channel is necessary and the system is efficient since heterodyning of the signals as well as other combinations thereof will not occur to jam or give false information in the system. Furthermore, an order of transmitting preference is established so that if certain selected stations have information which should be transmitted first in an instance when several stations may begin transmission at once, the preference is automatically rendered by the circuit of the present invention.

While a particular embodiment of the invention has been illustrated and described, it is understood that changes may be made and it is intended to cover all such changes and modifications as fall within the scope of the invention in the appended claims.

What is claimed is:

1. In a communication system of the type having a plurality of stations, each of which includes signal transmitting and receiving means operating in the system, and with the receiving means adapted to operate equipment in response to received information signals of certain duration and normally operative to receive signals and the transmitting means adapted to transmit signals indicating the condition of the equipment and normally inoperative, the priority control system whereby an order of preference is established for stations initiating transmissions of information substantially at one time, said system including at each station the combination of, first means adapted to render operative said transmitting means for transmission of a query signal and render inoperative said receiving means in response to information to be transmitted, timing means operated by said first means to render inoperative said transmitting means and operate said receiving means to terminate said query signal after a first time interval which interval is substantially the same for all stations in the system, said first time interval being of a duration too short to cause operation of said equipment, said timing means providing a second time interval following said first time interval with said second time interval being different for different stations in the system, means operating upon termination of said second time interval to render inoperative said receiving means and to operate said transmitting means for transmission of the information, said receiving means including signal presence means responsive to a signal in the system from another station for preventing operation of said transmitting means, and means coupled to said timing means and operating in response to operation of said signal presence means during said second time interval to restart said second time interval when operation of said signal presence means is terminated, whereby a station with the shorter second interval is operated first in the event of simultaneous operation of said first means at two stations.

2. In a communication system of the type having a plurality of stations, each of which includes signal transmitting and receiving means operating in the system, and with the receiving means normally operative to receive signals and the transmitting means normally inoperative, the priority control system whereby an order of preference for initiating transmissions of information is established for the stations, said system including at each station the combination of, first means adapted to operate said transmitting means for transmission of a query signal in response to information to be transmitted, timing means operated by said first means to render inoperative said transmitting means and operate said receiving means to terminate said query signal after a first time interval which is substantially the same for all stations in the system, said timing means providing a second time interval following said first time interval with said second time interval being different for each station, means operating upon termination of said second time interval to render inoperative said receiving means and operate said transmitting means for transmission of the information as a signal, and means responsive to a signal in the system from another station during said second interval to render inoperative said transmitting means and to operate said timing means to commence said second time interval anew upon termination of said signal in the system, whereby a station with the shorter second time interval is operated for transmission of information before one with a longer second time interval.

3. In a communication system of the type having a plurality of stations on a single channel, each of which includes an audio tone receiver and an audio tone transmitter, with the receiver being adapted to apply signals to the equipment of a certain duration for operating the same and the transmitter being adapted to produce tones indicating the condition of the equipment, the receiver normally being connected to the channel and the transmitter normally being disconnected from the channel, the priority control system whereby an order of preference is established for stations initiating transmissions, said system including at each station the combination of first means adapted to connect said transmitter to the channel for transmission of a query signal in response to information to be transmitted, timing means rendered operative by said first means to disconnect said transmitter and connect said receiver means to the channel after a first time interval defining the duration of said query signal which is substantially the same for all stations in the system, said first time interval being of a duration too short to cause operation of said equipment, said timing means operating to provide a second time interval following said first time interval with said second time interval being different for different stations in the system, means operating upon termination of said second time interval to disconnect said receiver and connect said transmitter to the channel for transmission of the information, said receiver including signal presence means responsive to a signal in the system from another station for preventing operation of said transmitter, and means coupled to said timing means operating in response to operation of said signal presence means during said second time interval to recommence said second time interval when operation of said signal presence means is terminated, whereby a station with the shorter second interval is operated first in the event of simultaneous operation of said first means at two stations.

4. In a communication system of the type having a plurality of stations on a single channel, each of which includes carrier wave receiving means and carrier wave transmitting means, the receiving means normally being energized and the transmitting means normally being de-energized, the priority control system whereby an order of preference is established for stations initiating transmissions, said system including at each station the combination of first means adapted to energize said transmitting means for transmission of a query signal in response to information to be transmitted, timing means rendered operative by said first means to de-energize said transmitting means and energize said receiving means after a first time interval defining the duration of said query signal which is substantially the same for all stations in the system, said timing means operating to provide a second time interval following said first time interval with said second time interval being different for different stations in the system, means operating upon termination of said second time interval to de-energize said receiving means and energize said transmitting means for transmission of the information, said receiving means including means responsive to a signal in the system from another station for preventing operation of said transmitting means and for restarting said second timed interval upon reception of a signal from another station during such interval, whereby a station with the shorter second interval is operated first in the event of simultaneous operation of said first means at two stations.

5. In a communication system of the type having a plurality of stations on a single channel, each of which includes audio tone receiving means and audio tone transmitting means, the receiving means normally being connected to the channel and the transmitting means normally being disconnected from the channel, the priority control system whereby an order of preference for initiating transmissions is established for the stations, said system including at each station the combination of first means adapted to connect said transmitting means to the channel for transmission of a query signal in response to information to be transmitted, timing means rendered operative by said first means to disconnect said transmitting means and connect said receiving means to the channel to determine the duration of said query signal after a first time interval which is substantially the same for all stations in the system, said timing means operating to provide a second time interval following said first time interval with said second time interval being different for each station, means operating upon termination of said second time interval to disconnect said receiving means and connect said transmitting means to the channel for transmission of the information, and means responsive to a signal in the system from another station during said second interval to disconnect said transmitting means from the channel and to operate said timing means to commence said second interval anew upon termination of said signal in the system, whereby a station with the shorter second interval is operated for transmission of information before one with a longer second interval.

6. In a communication system of the type having a plurality of stations on a single channel, each of which includes a carrier wave receiver and a carrier wave transmitter, the receiver normally being energized and the transmitter normally being de-energized, the priority control system whereby an order of preference for initiating transmissions is established for the stations, said system including at each station the combination of first means adapted to energize said transmitter for transmitting a query signal in response to information to be transmitted, timing means rendered operative by said first means to de-energize said transmitter and energize said receiver after a first time interval determining the duration of said query signal which is of the order of 50 milliseconds for all stations in the system, said timing means operating to provide a second time interval following said first time interval with said second time interval being different for each station, means operating upon termination of said second time interval to de-energize said receiver and energize said transmitter for transmission of the information, and means responsive to a signal in the system from another station during said second interval to de-energize said transmitting means and to operate said timing means to commence said second interval anew upon termination of said signal in the system, whereby a station with the shorter second interval is operated for transmission of information before one with a longer second interval.

7. In a communication system of the type having a plurality of stations on a given channel, the stations each including signal source means and signal detecting means, the priority control system wherein an order of preference is established between a plurality of stations all with intelligence to be conveyed within a given interval, the control system including at each station in combination, timing means coupled to the signal source and signal detecting means and adapted to define first and second sequentially timed intervals, said timing means rendering the signal source means operative to transmit a query signal and the detecting means inoperative during said first interval and the signal source means inoperative and detecting means operative during said second interval, said timing means being adapted to restart said second timed interval after interruption thereof, means coupled to the signal source means and said timing means to cause the signal source means to transmit intelligence after said second interval, means coupled to said timing means to operate the same on initiation of a transmission in response to intelligence to be conveyed, and interrupting means coupled to the detecting means and to said timing means and actuable by a received signal to interrupt said timing means during reception of a signal during said second timed interval, said second intervals differing in duration among the stations so that the station having the shorter second interval transmits its intelligence first when a plurality of stations attempt transmission at one time.

8. In a communication system of the type having a plurality of stations on a given channel, the stations each including signal transmitting means and signal receiving means, the priority control system wherein an order of transmission is established between a plurality of stations all with intelligence to be conveyed within a given time, the control system including at each station in combination, timer apparatus coupled to said signal transmitting means and said signal receiving means and adapted to define a priority determining period including first and second timed intervals, said transmitting means being operative to transmit a query signal and said receiving means inoperative during said first interval, said transmitting means being inoperative and said receiving means operative during said second interval, means coupled to said transmitting means and said timer apparatus to cause said transmitting means to transmit intelligence after said second timed interval, and means coupled to said timer apparatus to operate the same in response to intelligence to be conveyed, said receiving means including signal presence means operating in response to a signal received from another station in the system for rendering said transmitting means inoperative during reception of such signal at times other than during a priority determining period, said signal presence means being coupled to said timer apparatus and actuable by a received signal to interrupt said timer apparatus by reception of a signal during said second timed interval, said timer apparatus being adapted to recommence said second timed interval after interruption of said timer apparatus during said second timed interval, said second intervals differing in duration among the stations so that the station having the shorter second timed interval may transmit its intelligence first when a plurality of stations attempt transmission during said priority determining period.

9. In a communication system of the type having a plurality of stations, each of which includes transmitter and receiver means operating on the same channel with the receiver means normally operative and the transmitter means normally inoperative, the priority control system whereby an order of preference is established for stations attempting transmission at once, each station including in combination, timing means adapted to define first and second time intervals, first, second, third and fourth relay means, said first relay means being adapted to be energized in response to intelligence to be transmitted to operate said timing means and to operate said transmitter means for transmission of a query signal and to disable said receiver means, said second relay means being operated by said timing means after said first interval to terminate said query signal and to energize said third relay means, said third relay means operating said timing means to de-energize said second relay means after said second interval, de-energization of said second relay means actuating said fourth relay means to apply the intelligence to said transmitter means for transmission in the system, said receiver means having signal presence means operable by a signal in the system to hold said first relay means operated and render inoperative said third relay means and at the cessation of a signal in the system to render operative said third relay means to recommence timing of said second interval whereby a station with the shorter second interval is operated for transmission of intelligence before one with a longer second interval.

References Cited in the file of this patent

UNITED STATES PATENTS

| | | |
|---|---|---|
| 1,771,234 | Remington | July 22, 1930 |
| 1,844,648 | Farley | Feb. 9, 1932 |
| 2,694,802 | Terry | Nov. 16, 1954 |